US010990128B2

(12) United States Patent
Amano et al.

(10) Patent No.: US 10,990,128 B2
(45) Date of Patent: Apr. 27, 2021

(54) PORTABLE INFORMATION APPARATUS HAVING A DISPLAY

(71) Applicant: LENOVO (SINGAPORE) PTE. LTD., Singapore (SG)

(72) Inventors: Masayuki Amano, Kanagawa (JP); Kenji Watamura, Kanagawa (JP); Seita Horikoshi, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/555,481

(22) Filed: Aug. 29, 2019

(65) Prior Publication Data

US 2020/0073439 A1    Mar. 5, 2020

(30) Foreign Application Priority Data

Aug. 31, 2018    (JP) .............................. JP2018-163045

(51) Int. Cl.
*G06F 1/16*    (2006.01)
(52) U.S. Cl.
CPC .......... *G06F 1/1637* (2013.01); *G06F 1/1616* (2013.01); *G06F 1/1683* (2013.01)
(58) Field of Classification Search
None
See application file for complete search history.

(56) References Cited

U.S. PATENT DOCUMENTS

| 8,259,080 | B2* | 9/2012 | Casparian | G06F 1/1647 |
| | | | | 345/173 |
| 8,751,970 | B2* | 6/2014 | Hinckley | G06F 3/04883 |
| | | | | 715/863 |
| 9,274,682 | B2* | 3/2016 | Hinckley | G06F 3/04883 |
| 2009/0153438 | A1* | 6/2009 | Miller | G09G 3/3225 |
| | | | | 345/55 |
| 2009/0244016 | A1* | 10/2009 | Casparian | G06F 1/1692 |
| | | | | 345/173 |
| 2010/0039764 | A1* | 2/2010 | Locker | G06F 1/1669 |
| | | | | 361/679.29 |
| 2013/0257733 | A1* | 10/2013 | Moore | G06F 1/1669 |
| | | | | 345/168 |
| 2017/0347469 | A1* | 11/2017 | Heo | G06F 3/041 |
| 2018/0042127 | A1* | 2/2018 | Kim | G06F 3/04164 |
| 2018/0188774 | A1* | 7/2018 | Ent | G06F 1/1618 |

FOREIGN PATENT DOCUMENTS

| CN | 204759934 U | 11/2015 |
| CN | 105379420 A | 3/2016 |
| CN | 107436704 A | 12/2017 |

(Continued)

*Primary Examiner* — Anthony Q Edwards
*Assistant Examiner* — Rashen E Morrison
(74) *Attorney, Agent, or Firm* — Antony P. Ng; Russell Ng PLLC

(57) ABSTRACT

An electronic apparatus having a display that appears to be floating in air is disclosed. The electronic apparatus includes a first transparent plate; a second transparent plate facing the first transparent plate; a display provided between the first transparent plate and the second transparent plate to partially cover the first transparent plate and the second transparent plate; and a transparent member provided between the first transparent plate and the second transparent plate to fill around the display.

15 Claims, 4 Drawing Sheets

(56) References Cited

FOREIGN PATENT DOCUMENTS

| JP | 10-25975 A | 1/1998 |
|----|------------|--------|
| JP | 2011-242480 A | 12/2011 |
| JP | 2015-72305 A | 4/2015 |
| JP | 2015-130320 A | 7/2015 |
| JP | 2016-164731 A | 9/2016 |
| WO | 2011-108334 | 6/2013 |

* cited by examiner

PORTABLE INFORMATION APPARATUS HAVING A DISPLAY

PRIORITY CLAIM

The present application claims benefit of priority under 35 U.S.C. §§ 120, 365 to the previously filed Japanese Patent Application No. JP2018-163045 with a priority date of Aug. 31, 2018, which is incorporated by reference herein.

TECHNICAL FIELD

The present invention relates to portable information apparatuses in general, and in particular to a portable information apparatus having a display.

BACKGROUND

A portable information apparatus commonly includes a display and a keyboard. In general, a colored bezel is provided around the display.

SUMMARY

The present disclosure provides an electronic apparatus having a display that appears to be floating in air.

In accordance with an embodiment of the present disclosure, an electronic apparatus includes a first transparent plate; a second transparent plate facing the first transparent plate; a display provided between the first transparent plate and the second transparent plate to partially cover the first transparent plate and the second transparent plate; and a transparent member provided between the first transparent plate and the second transparent plate to fill around the display.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
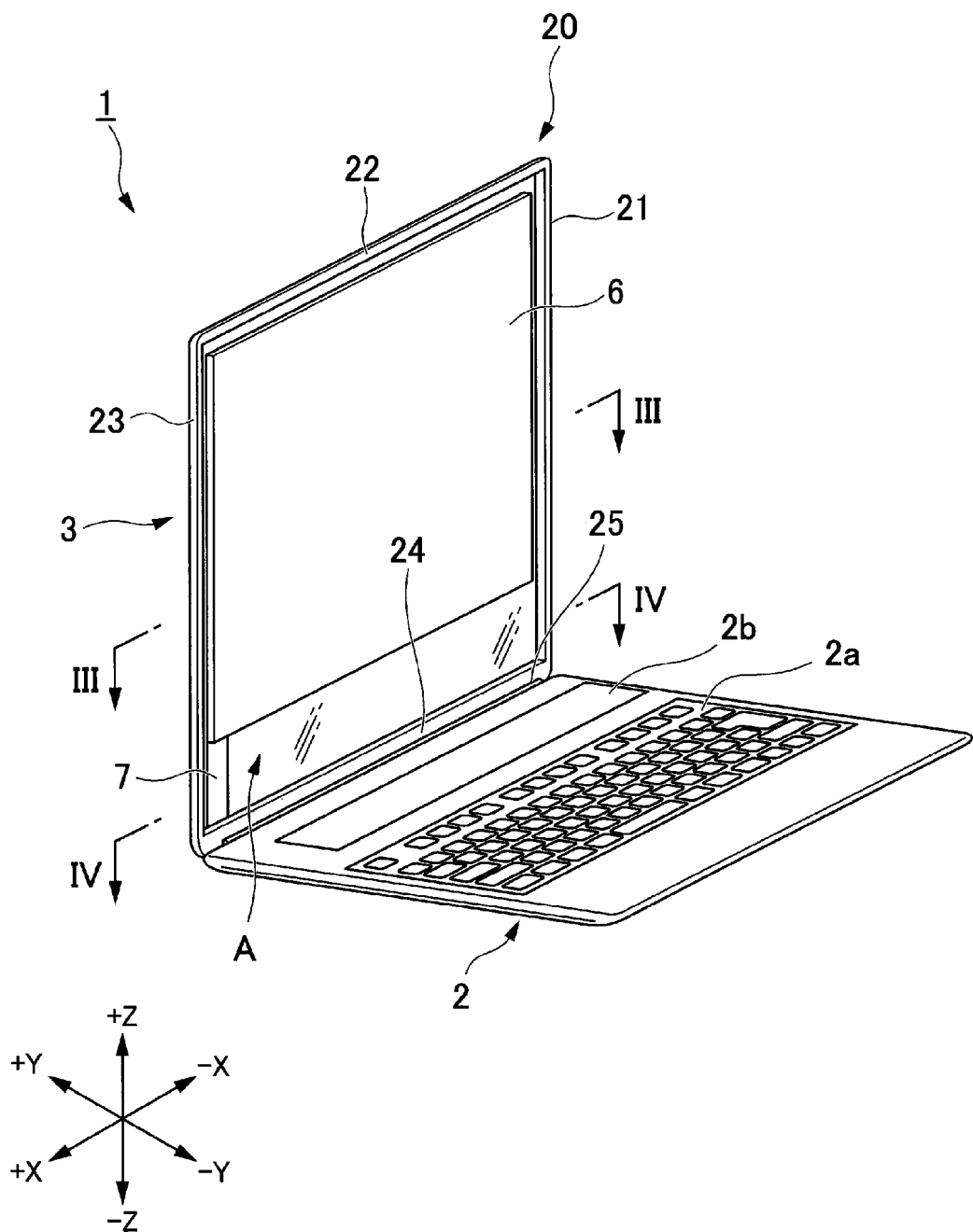
FIG. 1 is a perspective view of an electronic apparatus, according to one embodiment.

As shown in FIG. 1, an electronic apparatus 1 is a so-called clamshell laptop personal computer (PC) that includes a main body 2 and a display unit 3. The main body 2 and the display unit 3 are relatively movable between a state where the display unit 3 is open with respect to the main body 2 and a state where the display unit 3 is closed with respect to the main body 2. That is, the display unit 3 and the main body 2 can overlap each other.

The present embodiment may be applied not only to a laptop PC but also to electronic apparatuses such as desktop PCs, tablet terminals, and mobile phones.

I. Definition of Directions

In the present embodiment, a positional relationship between components is described with an XYZ Cartesian coordinate system. Hereinafter, a direction along the X-axis is referred to as a right-left direction X; a direction along the Y-axis is referred to as a front-rear direction Y; and a direction along the Z-axis is referred to as a top-bottom direction Z. Furthermore, one side in the right-left direction X is referred to as the +X side (the left), and the other side is referred to as the −X side (the right). One side in the front-rear direction Y is referred to as the +Y side (the rear), and the other side is referred to as the −Y side (the front). One side in the top-bottom direction Z is referred to as the +Z side (the top), and the other side is referred to as the −Z side (the bottom).

In the following description, unless otherwise specially noted, the positional relationship between components is described on the basis of a posture of the display unit 3 when its height and length extend in the top-bottom direction Z and the right-left direction X, respectively.

II. Main Body

The main body 2 includes a flat chassis with its length and width extending in the right-left direction X and the front-rear direction Y, respectively. Inside the chassis, a motherboard (a circuit board), a battery, etc. are installed. The main body 2 is rotatably connected to the display unit 3 through a hinge 25. It is to be noted that the main body 2 and the display unit 3 may be configured to be separable from each other. Furthermore, the electronic apparatus 1 does not have to include the main body 2. In this case, the motherboard, the battery, etc. may be installed in the display unit 3.

On a top surface of the chassis of the main body 2, an input unit 2a and a sub display 2b are provided. The input unit 2a is, for example, a keyboard. The sub display 2b is, for example, a liquid crystal display (LCD) or an organic electroluminescence (EL) display. The sub display 2b has a rectangular shape that is long in the right-left direction X and short in the front-rear direction Y.

The hinge 25 connects a −Z-side end of the display unit 3 and a +Y-side end of the main body 2, and extends in the right-left direction X. The sub display 2b is located on the +Y side of the input unit 2a. In other words, the sub display 2b is provided in a position closer to the hinge 25 than the input unit 2a is.

The display unit 3 includes a display 6. The display 6 is, for example, an LCD or an organic EL display. A wire 7 is connected to the display 6. The display 6 and the motherboard, etc. of the main body 2 are electrically connected through the wire 7.

The display unit 3 has a transparent region A. When the display unit 3 is viewed from the front-rear direction Y, except for a portion connected to the wire 7, the display 6 is surrounded by the transparent region A. This makes the display 6 appear to be floating in air.

Figure 2:
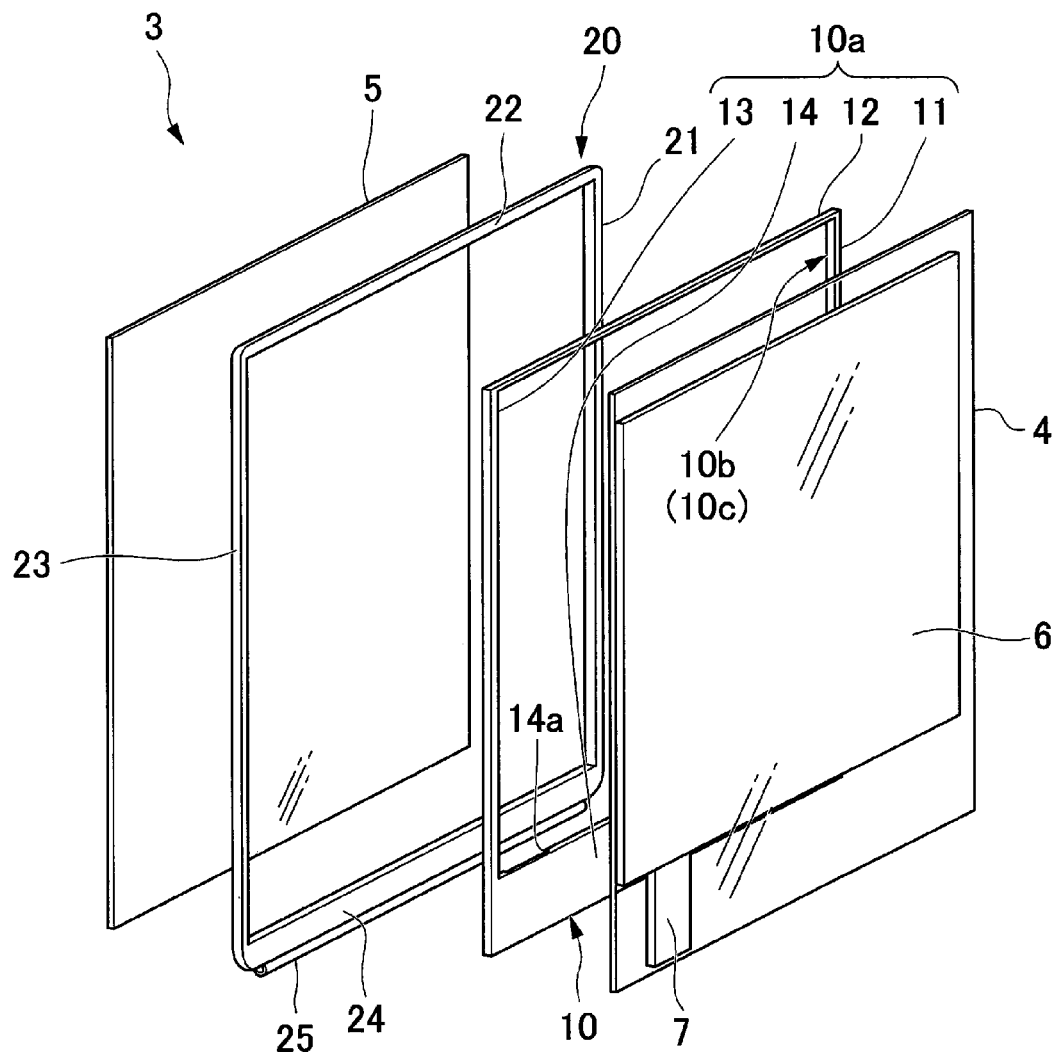
FIG. 2 is an exploded perspective view of a display unit shown in FIG. 1.

As shown in FIG. 2, the display unit 3 includes a first transparent plate 4, a transparent member 10, a frame body 20, a second transparent plate 5, and the display 6. The transparent region A is made up by an overlap of the first transparent plate 4, the transparent member 10, and the second transparent plate 5 in the front-rear direction Y.

The first transparent plate 4 and the second transparent plate 5 hold the frame body 20, the transparent member 10, and the display 6 in the front-rear direction Y between them. The first transparent plate 4 is located on the −Y side of the display 6, and the second transparent plate 5 is located on the +Y side of the display 6.

The first transparent plate 4 and the second transparent plate 5 are formed into a transparent plate with its height and length extending in the top-bottom direction Z and the right-left direction X, respectively. In the present embodiment, the first transparent plate 4 and the second transparent plate 5 are formed into a rectangle when viewed from the front-rear direction Y. As the first transparent plate 4 and the second transparent plate 5, for example, glass or transparent resin can be used. The display unit 3 may be used as a touch panel by providing the surface of the first transparent plate 4 with a transparent touch sensor.

The frame body 20 is made of, for example, a metallic material, such as aluminum alloy and magnesium alloy, or fiber-reinforced plastic. The frame body 20 includes a right frame 21, a top frame 22, a left frame 23, and a bottom frame 24. The frame body 20 is formed of these frames 21 to 24 into a rectangular frame viewed from the front-rear direction Y. The right frame 21 and the left frame 23 extend in the top-bottom direction Z, and the top frame 22 and the bottom frame 24 extend in the right-left direction X. The top frame 22 connects respective +Z-side ends of the right frame 21 and the left frame 23. The bottom frame 24 connects respective −Z-side ends of the right frame 21 and the left frame 23.

The hinge 25 is provided on a −Z-side end of the bottom frame 24.

Figure 3:
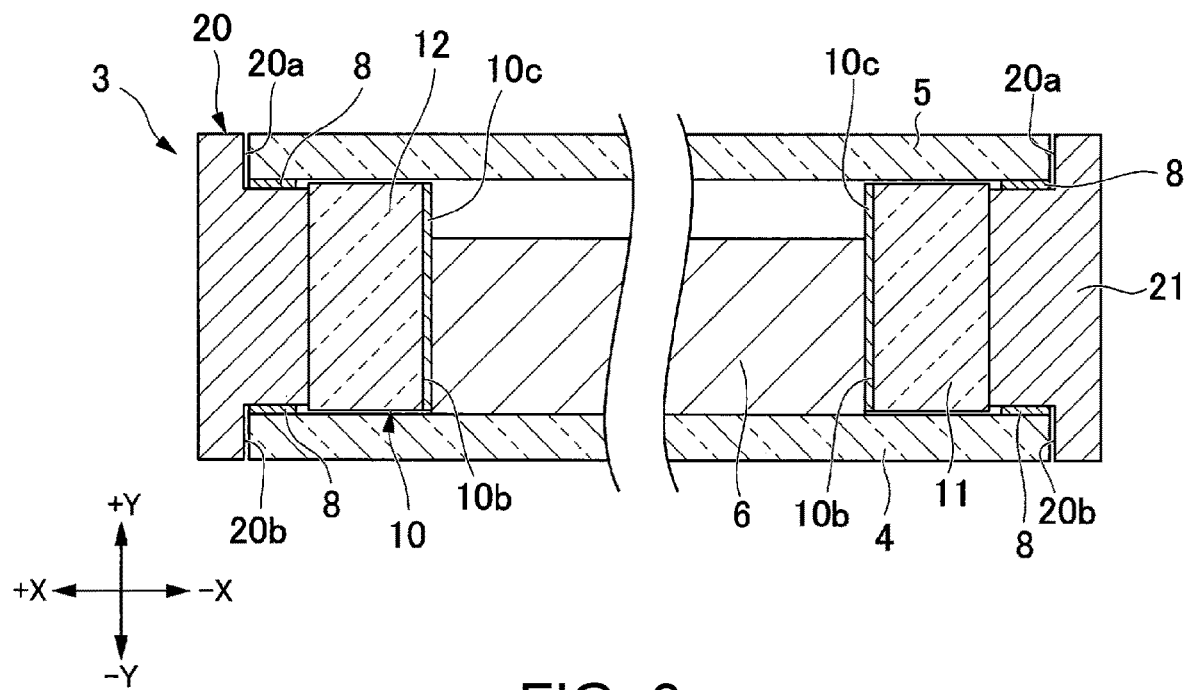
FIG. 3 is a cross-sectional view of the display unit along a line shown in FIG. 1.

As shown in FIG. 3, the frame body 20 is formed with a first recessed portion 20a and a second recessed portion 20b. The first recessed portion 20a is recessed from a +Y-side end surface of the frame body 20 toward the −Y side. The second recessed portion 20b is recessed from a −Y-side end surface of the frame body 20 toward the +Y side. The first recessed portion 20a and the second recessed portion 20b are formed along the frames 21 to 24 of the frame body 20. Thus, the recessed portions 20a and 20b are formed into a rectangular frame viewed from the front-rear direction Y.

The recessed portions 20a and 20b are formed on a +X-side end of the right frame 21, a −Z-side end of the top frame 22, a −X-side end of the left frame 23, and a +Z-side end of the bottom frame 24. Respective dimensions of the recessed portions 20a and 20b in the right-left direction X are greater than respective dimensions of the first and second transparent plates 4 and 5 in the right-left direction X. Respective dimensions of the recessed portions 20a and 20b in the top-bottom direction Z are greater than respective dimensions of the first and second transparent plates 4 and 5 in the top-bottom direction Z.

At least a portion of the first transparent plate 4 is located inside the first recessed portion 20a. The first transparent plate 4 is attached to an inner surface of the first recessed portion 20a with an adhesive 8. As the adhesive 8, for example, ultraviolet curing resin, thermoset resin, thermoplastic resin, or a double-sided tape can be used. In an example of FIG. 3, the adhesive 8 is provided on an inner surface of the first recessed portion 20a that faces to the +Y side. Alternatively, the adhesives 8 may be provided on inner surfaces of the first recessed portion 20a that face to the right-left direction X.

At least a portion of the second transparent plate 5 is located inside the second recessed portion 20b. The second transparent plate 5 is attached to an inner surface of the second recessed portion 20b with the adhesive 8. In the example of FIG. 3, the adhesive 8 is provided on an inner surface of the second recessed portion 20b that faces to the −Y side. Alternatively, the adhesives 8 may be provided on inner surfaces of the second recessed portion 20b that face to the right-left direction X.

The first transparent plate 4 and the second transparent plate 5 are attached and fastened to the frame body 20 with the multiple adhesives 8. In the present embodiment, the entire first transparent plate 4 is located inside the first recessed portion 20a, and the entire second transparent plate 5 is located inside the second recessed portion 20b.

The display 6 is fastened to the first transparent plate 4. The display 6 is, for example, an LCD or an organic EL display. A user can visually recognize the display 6 through the first transparent plate 4. The display 6 is formed into a rectangle when viewed from the front-rear direction Y. The wire 7 is connected to the back side (a +Y-side surface) of the display 6. A process of connecting the wire 7 to the display 6 can be performed after the display 6, the first transparent plate 4, and the transparent member 10 are assembled. Thus, even if the display 6 is fastened to the first transparent plate 4, the wire 7 can be housed in a wire housing 14a (to be described later) of the transparent member 10.

It is to be noted that in a case where the display unit 3 is used as a touch panel, a touch sensor is provided between the display 6 and the first transparent plate 4.

The transparent member 10 is made of transparent resin. As a material of the transparent member 10, for example, polycarbonate (PC) or polymethyl methacrylate (PMMA) can be used. The transparent member 10 may be formed by injection molding, or may be formed by cutting.

As shown in FIG. 2, the transparent member 10 includes an enclosure 10a that surrounds the display 6. In the present embodiment, the enclosure 10a is formed into a rectangular frame so as to surround the rectangular display 6. The enclosure 10a has a right part 11, a top part 12, a left part 13, and a bottom part 14. The right part 11, the top part 12, the left part 13, and the bottom part 14 are integrally formed. That is, the enclosure 10a is integrally formed.

A gap between the right part 11 and the left part 13 in the right-left direction X is larger than a dimension of the display 6 in the right-left direction X. A gap between the top part 12 and the bottom part 14 in the top-bottom direction Z is larger than a dimension of the display 6 in the top-bottom direction Z.

A dimension of the transparent member 10 in the right-left direction X is smaller than a gap between the right frame 21 and the left frame 23 of the frame body 20 in the right-left direction X. A dimension of the transparent member 10 in the top-bottom direction Z is smaller than a gap between the top frame 22 and the bottom frame 24 of the frame body 20 in the top-bottom direction Z.

The right part 11 is located on the −X side of the display 6; the top part 12 is located on the +Z side of the display 6; the left part 13 is located on the +X side of the display 6; and the bottom part 14 is located on the −Z side of the display 6.

The right part 11 and the left part 13 extend in the top-bottom direction Z, and the top part 12 and the bottom part 14 extend in the right-left direction X. The top part 12 connects respective +Z-side ends of the right part 11 and the left part 13. The bottom part 14 connects respective −Z-side ends of the right part 11 and the left part 13.

A width of the bottom part 14 in the top-bottom direction Z is larger than a width of the top part 12 in the top-bottom direction Z. Furthermore, the width of the bottom part 14 in the top-bottom direction Z is larger than respective widths of the right part 11 and the left part 13 in the right-left direction X. That is, the width of the bottom part 14 is larger than those of the other parts 11 to 13 of the enclosure 10a.

The bottom part 14 is provided with the wire housing 14a. The wire housing 14a is a recessed portion formed on the bottom part 14. The wire housing 14a is recessed from a +Y-side end surface of the bottom part 14 toward the −Y side. The wire housing 14a is located at an end of the bottom part 14 in the right-left direction X. The wire housing 14a extends from a +Z-side end surface to a −Z-side end surface of the bottom part 14 in the top-bottom direction Z. That is, the wire housing 14a is formed so as to cross the bottom part 14 in the top-bottom direction Z.

Figure 4:
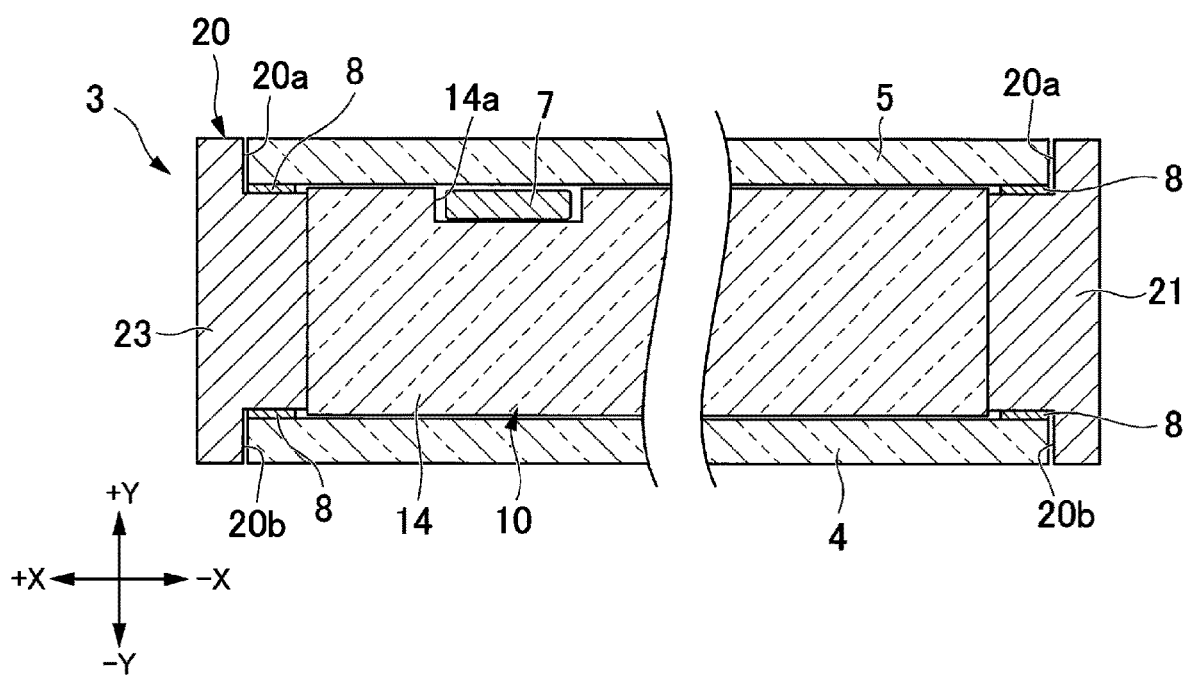
FIG. 4 is a cross-sectional view of the display unit along a line Iv-Iv shown in FIG. 1.

As shown in FIG. 4, a width of the wire housing 14a in the right-left direction X is larger than a width of the wire 7 in the right-left direction X. A width (a depth) of the wire housing 14a in the front-rear direction Y is larger than a thickness of the wire 7 in the front-rear direction Y. At least a portion of the wire 7 is located inside the wire housing 14a.

It is to be noted that the width of the wire housing 14a in the front-rear direction Y may be smaller than the thickness of the wire 7 in the front-rear direction Y. Also in this case, for example, by providing a gap in the front-rear direction Y between the transparent member 10 and the second transparent plate 5, the wire 7 can be housed in a space formed by the wire housing 14a and the second transparent plate 5.

As shown in FIG. 3, of the enclosure 10a, an inner surface 10b facing the display 6 is provided with a thin film 10c. It is to be noted that the inner surface 10b includes a +X-side end surface of the right part 11, a −Z-side end surface of the top part 12, a −X-side end surface of the left part 13, and a +Z-side end surface of the bottom part 14. As a material of the thin film 10c, metal such as aluminum is suitable. The thin film 10c can be provided on the surface of the inner surface 10b, for example, by vapor deposition or plating. By forming a reflecting surface on the surface of the inner surface 10b with the thin film 10c, for example, an end surface of the display 6 becomes less visually recognizable through the transparent member 10. It is to be noted that a reflecting surface may be formed without the thin film 10c, for example, by mirror-polishing the inner surface 10b.

The transparent member 10 is located inside the frame body 20 formed into a frame. Furthermore, the display 6 is located inside the transparent member 10 formed into a frame. Then, the transparent member 10 and the display 6 are held between the first transparent plate 4 and the second transparent plate 5 in the front-rear direction Y.

In the above-described configuration, the transparent member 10 is provided to fill the gaps formed by the frame body 20, the display 6, the first transparent plate 4, and the second transparent plate 5.

Figure 5:
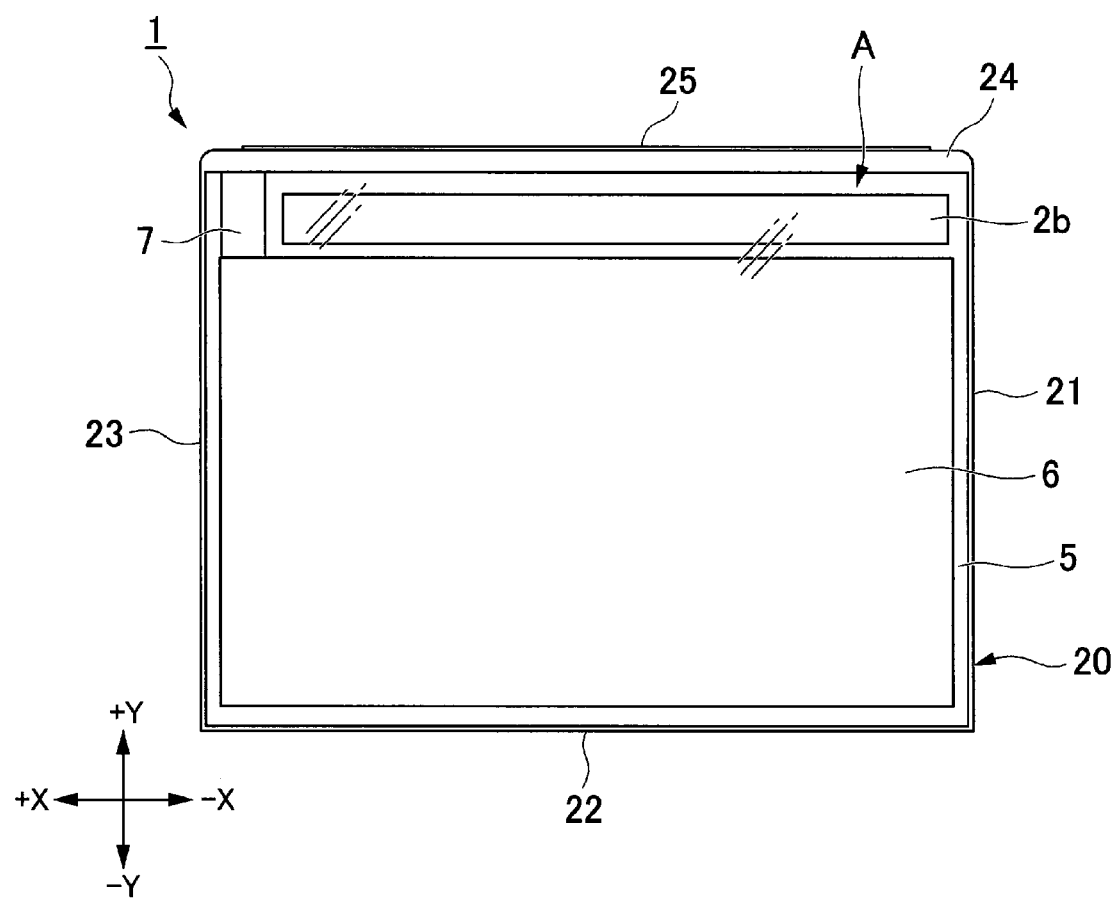
FIG. 5 is a diagram of the electronic apparatus from FIG. 1 when the display unit and a main body overlapping each other.

FIG. 5 shows a state where the display unit 3 and the main body 2 overlap each other after the display unit 3 has been moved rotationally around the hinge 25 from the state shown in FIG. 1.

As shown in FIG. 5, when the display unit 3 and the main body 2 overlap each other, the positions of the transparent region A and the sub display 2b coincide with each other. More specifically, respective overlapping portions of the first transparent plate 4, the bottom part 14 of the transparent member 10, and the second transparent plate 5 cover the sub display 2b. Thus, the user can visually recognize the sub display 2b through the transparent region A. The second transparent plate 5 may be provided with a touch sensor that overlaps with the sub display 2b when the display unit 3 is in a closed state. In this case, the user can operate a screen of the sub display 2b through the touch sensor provided on the second transparent plate 5.

As described above, the electronic apparatus 1 according to the present embodiment includes the first transparent plate 4, the second transparent plate 5 facing the first transparent plate 4, the display 6, and the transparent member 10. The display 6 is provided between the first transparent plate 4 and the second transparent plate 5 to partially cover the first transparent plate 4 and the second transparent plate 5. The transparent member 10 is provided between the first transparent plate 4 and the second transparent plate 5 to fill around the display 6. Therefore, the display 6 is positioned within the transparent region A formed by the first transparent plate 4, the second transparent plate 5, and the transparent member 10, which can make the display 6 appear to be floating in air.

Furthermore, the transparent member 10 includes the enclosure 10a that surrounds the display 6; at least the enclosure 10a is integrally molded. In this way, the enclosure 10a completely surrounds the display 6, thus the shape of the transparent member 10 is less visually recognizable, which can more certainly make the display 6 appear to be floating in air.

Moreover, the transparent member 10 includes the enclosure 10a that surrounds the display 6; a reflecting surface (the thin film 10c) is formed on, of the enclosure 10a, the inner surface 10b facing the display 6. Accordingly, for example, when the display unit 3 is viewed from an oblique direction, the end surface of the display 6 becomes less visually recognizable through the transparent member 10, which can make the appearance of the electronic apparatus 1 better.

Furthermore, the electronic apparatus 1 further includes the frame body 20 that surrounds the display 6. This frame body 20 enhances the stiffness and strength of the entire display unit 3. Then, the transparent member 10 is provided to fill the entire gap formed by the frame body 20, the display 6, the first transparent plate 4, and the second transparent plate 5. This configuration allows the transparent region A to be provided on the inside of the frame body 20, and the display 6 can be positioned within the transparent region A.

Moreover, the transparent member 10 is formed with the wire housing 14a; at least a portion of the wire 7 of the display 6 is located inside the wire housing 14a. This allows the main body 2 and the display 6 to be electrically connected through the wire 7. Furthermore, by positioning the wire housing 14a at the end of the bottom part 14 of the transparent member 10 in the right-left direction X, the wire 7 can be made less noticeable.

Moreover, the adhesives 8 are provided between the first transparent plate 4 and the frame body 20 and between the second transparent plate 5 and the frame body 20. Thus, the first transparent plate 4, the second transparent plate 5, and the frame body 20 are fastened to one another. Then, the transparent member 10 is held between the first transparent plate 4 and the second transparent plate 5, thereby being fastened to them. Meanwhile, no adhesives are provided between the first transparent plate 4 and the transparent member 10 and between the second transparent plate 5 and the transparent member 10. In this way, no adhesives are provided in the transparent region A, and thereby the appearance of the electronic apparatus 1 can be made better.

Furthermore, the main body 2 is provided with the sub display 2*b* that is visually recognizable through the first transparent plate 4, the transparent member 10, and the second transparent plate 5 when the display unit 3 and the main body 2 overlap each other. Accordingly, in the clamshell electronic apparatus 1, the sub display 2*b* can be visually recognized even when the display unit 3 is in a closed state.

It is to be noted that the technical scope of the present invention is not limited to the above-described embodiment, and various modifications can be made without departing from the scope of the invention.

For example, in the above-described embodiment, the main body 2 is provided with the sub display 2*b*; however, it does not have to be provided with the sub display 2*b*.

Furthermore, in the above-described embodiment, the display unit 3 and the main body 2 are connected so as to be rotationally movable around the hinge 25; however, the display unit 3 and the main body 2 may be configured, for example, to make a slide movement.

As has been described, the present invention provides an electronic apparatus having a display that appears to be floating in air.

While the invention has been particularly shown and described with reference to a preferred embodiment, it will be understood by those skilled in the art that various changes in form and detail may be made therein without departing from the spirit and scope of the invention.

What is claimed is:

1. An electronic apparatus comprising:
   a main body having a sub display; and
   a display unit rotatably connected to said main body via a hinge, wherein said, display unit includes
   a first transparent plate;
   a second transparent plate facing said first transparent plate, wherein said sub display is visually recognizable through said first transparent plate and said second transparent plate when said display unit and said main body overlap each other;
   a display, provided between said first transparent plate and said second transparent plate, contacts said first transparent plate and partially covers said first transparent plate and said second transparent plate; and
   a transparent region, located along an edge adjacent to said hinge, formed by said first transparent plate and said second transparent plate.

2. The electronic apparatus of claim 1, wherein said display unit further includes a transparent member located between said display and said second transparent plate.

3. The electronic apparatus of claim 2, wherein said transparent member includes an opening that overlaps said display.

4. The electronic apparatus of claim 3, wherein said transparent member further includes comprising a transparent area that overlaps said transparent region.

5. The electronic apparatus of claim 2, wherein said transparent member is formed with a wire housing.

6. The electronic apparatus of claim 5, wherein a portion of a wire of said display is located inside said wire housing.

7. The electronic apparatus of claim 2, wherein said display unit further includes a frame body for holding said first and second transparent plates, said transparent member and said display.

8. The electronic apparatus of claim 1, wherein said display is smaller than said first and second transparent plates.

9. The electronic apparatus of claim 8, wherein said transparent region extends to surround said display to make said display appear to be floating in ai.

10. The electronic apparatus of claim 1, wherein no adhesives are provided between said first transparent plate and said transparent member.

11. The electronic apparatus of claim 10, wherein no adhesives are provided between said second transparent plate and said transparent member.

12. The electronic apparatus of claim 1, wherein said display is a liquid crystal display.

13. The electronic apparatus of claim 1, wherein said display is an organic electroluminescence display.

14. The electronic apparatus of claim 1, wherein said sub display is a liquid crystal display.

15. The electronic apparatus of claim 1, wherein said sub display is an organic electroluminescence display.

* * * * *